United States Patent [19]

Okamoto et al.

[11] Patent Number: 4,984,083

[45] Date of Patent: Jan. 8, 1991

[54] IMAGE PROCESSING SYSTEM

[75] Inventors: Kaneyuki Okamoto; Hideo Nishijima; Michio Masuda; Hiroyasu Ohtsubo; Koichi Ono, all of Katsuta, Japan

[73] Assignee: Hitachi, Ltd., Tokyo, Japan

[21] Appl. No.: 373,630

[22] Filed: Jun. 28, 1989

Related U.S. Application Data

[63] Continuation of Ser. No. 47,156, May 8, 1987, abandoned.

[30] Foreign Application Priority Data

May 12, 1986 [JP] Japan .................... 61-106609
May 19, 1986 [JP] Japan .................... 61-112604

[51] Int. Cl.$^5$ .................................... H04N 5/45
[52] U.S. Cl. ........................ 358/183; 358/22
[58] Field of Search ......................... 358/183, 22

[56] References Cited

U.S. PATENT DOCUMENTS

| | | | |
|---|---|---|---|
| 4,134,131 | 1/1979 | Hopkins, Jr. ............... | 358/149 |
| 4,163,248 | 7/1979 | Heitmann .................. | 358/13 |
| 4,220,965 | 9/1980 | Heitmann et al. .......... | 358/183 |
| 4,231,063 | 10/1980 | Ito et al. .................. | 358/19 |
| 4,249,213 | 2/1981 | Imaide et al. ............. | 358/183 |
| 4,267,560 | 5/1981 | Ishikawa et al. ........... | 358/22 |
| 4,562,435 | 12/1985 | McDonough et al. ...... | 340/799 |
| 4,656,515 | 4/1987 | Christopher .............. | 358/183 |
| 4,665,438 | 5/1987 | Miron et al. .............. | 358/22 |

FOREIGN PATENT DOCUMENTS 175590 3/1986 .
37778 4/1981 Japan .................... 358/183

OTHER PUBLICATIONS

Masuda, Fully Digitalized Color Picture in Picture Television System, IEEE Transactions on Consumer Electronics, vol. CE-25, Feb. 1979.

*Primary Examiner*—John W. Shepperd
*Attorney, Agent, or Firm*—Antonelli, Terry, Stout & Kraus

[57] ABSTRACT

An image processing system comprising a first and second video signal sources providing a main-field video signal and sub-field video signal, respectively, means for compressing the sub-field video signal on the time axis, and a signal merging unit which merges the compressed sub-field video signal into the main-field video signal and delivers the resulting signal to a television receiver set, wherein the signal compressing means comprising a dual-port memory having a first and second ports and operating to compress the sub-field video signal on the time axis and store the compressed signal, and control means for controlling the reading and writing of the memory for the sub-field video signal, the control means comprising a first control section for writing the sub-field video signal into the first port of said memory, a second control section for transferring a signal from the first port to the second port, and a third control section for reading out a signal from the second port, said memory implementing the reading operation and writing operation in asynchronous manner.

3 Claims, 10 Drawing Sheets

IMAGE PROCESSING SYSTEM

This application is a continuation of application Ser. No. 047,156, filed May 8, 1987, now abandoned.

BACKGROUND OF THE INVENTION

The present invention relates to an image processing system. The image processing system of the present invention is especially suitable for use in an apparatus which receives two different video signals, for example, two different video signals from a magnetic recording-/reproducing apparatus such as a video tape recorder and a signal source such as a television tuner, compresses one of the two video signals on the time axis, merges the compressed video signal into the other video signal, and supplies the resultant signal to a Braun tube in a television set so that two-field images are displayed simultaneously on the Braun tube.

Such a system which simultaneously displays two different video signals on one Braun tube, is well known and is called a "picture-in-picture system".

A conventional apparatus using the above-described system is provided with, two memories for storing one of two different video signals to be displayed in a subfield (small area) on the Braun tube. The video signal is written sequentially into the memories and at the same time the signal is read out from the memories in a compressed form. The retrieved signal is merged into the other video signal to be displayed in a main-field (large area) on the Braun tube. Writing and reading of the two memories are switched at the input and output stages of the memories in synchronism with the two video signals. Namely, writing into the memories is in synchronism with the sub-field video signal, while reading from the memories is in synchronism with the main-field video signal.

However, in the above-mentioned system with the ability of simultaneous reading and writing of the memories, the main-field and sub-field video signals are usually out of phase with each other, and therefore the memory contents are replaced with the next field information in the course of monitoring for the sub-field, with the result that different images are displayed on the upper and lower portions of the sub-field. This problem can be solved by the provision of three memories which are sequentially written and read the sub-field video signal.

But, the system having a plurality of memories, with their input and output being switched for reading and writing, requires a complex input/output control system and therefore it is rendered expensive.

SUMMARY OF THE INVENTION

An object of the present invention is to provide an image processing system which is simple in structure and is capable of satisfactory sub-field display without a joint line or a vertical jolt.

To achieve the above objective, the image processing system according to the present invention comprises a dual-port memory, and a means for controlling the writting of the sub-field video signal to the first port of the dual-port memory, data transfer from the first port to the second port of the dual-port memory, and reading of the data through the second port without a phase outrun phenomenon.

DESCRIPTION OF THE PREFERRED EMBODIMENTS

Embodiments of the present invention will be described with reference to the drawings.

Figure 1:
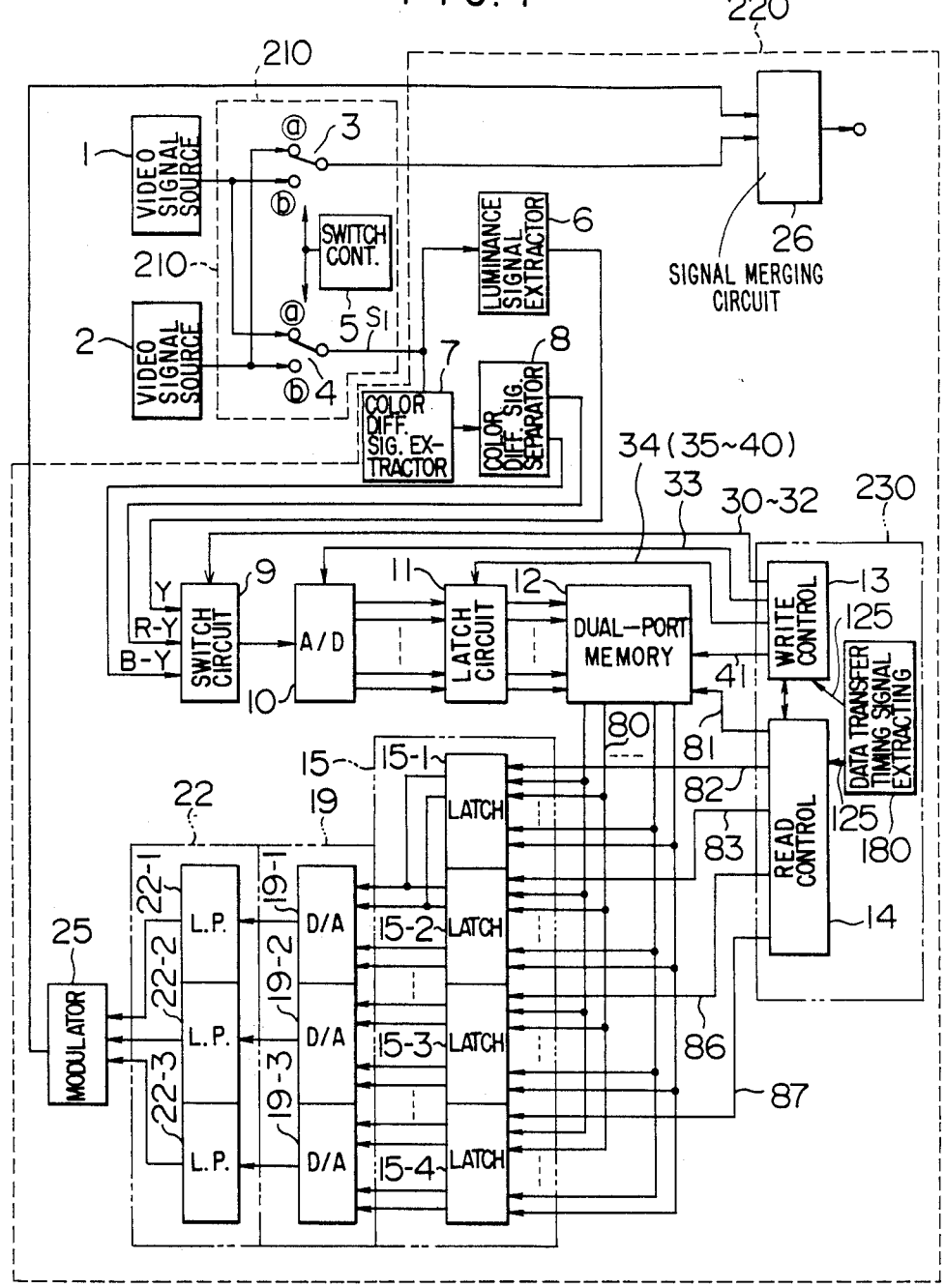
FIG. 1 is a block diagram of the image processing system embodying the present invention.

FIG. 1 shows in block diagram the image processing system which represents an embodiment of this invention. In the figure, symbols 1 and 2 denote a first and second video signal sources, which includes a television tuner and video tape recorder-player, for example. Symbol 210 denotes a video signal switching unit which selectively allots the first and second video signals to a main-field (large field) video signal and a sub-field (small field) video signal, and the unit 210 consists of switch circuits 3 and 4 connected to the first and second video signal sources 1 and 2, respectively, and a switch control circuit 5 for operating the switch circuits. The video signal switching unit 210 can be eliminated when the first and second video signals are allotted fixedly to the main-frame video signal and sub-field video signal, or vice versa.

Symbol 220 denotes a video signal processing unit, which includes circuits for extracting a luminance signal (Y) and color-difference signals (R-Y, B-Y) from the sub-field video signal originating from the video signal source 1 or 2 as selected by the video signal switching unit 210, i.e., these circuits are a luminance signal extractor (low-pass filter) 6, color-difference signal extractor (band-pass filter) 7 and color-difference signal separator (color-difference signal demodulator) 8, a switch circuit 9 for selecting one of these signals, an analog-to-digital (A/D) converter 10 for transforming the selected signal into a digital signal, a latch circuit 11 for holding the digital signal, a dual-port memory 12 for storing the signal provided by the latch circuit, a latch circuit 15 for holding the signal read out of the memory, a digital-to-analog (D/A) converter 19 for transforming the signal provided by the latch circuit 15 into an analog signal, a low-pass filter 22 for conducting a certain frequency band of the analog signal, a modulator 25 for modulating the filtered signal, and a signal merging circuit 26 which combines the signal modulated by the modulator 25 (sub-field video signal) with the main-field video signal originating from the video signal source 1 or 2 as selected by the video signal switch circuit 210 and supplies the merged signal to the Braun tube in a television receiver set. The memory 12 includes a time-axis compressing means.

Symbol 230 denotes a control unit connected to the video signal processing unit 220, and it controls the reading and writing of the memory for the sub-field video signal selected by the video signal switching unit 210. The control unit 230 includes a write control circuit 13 in connection with the memory 12, switch circuit 9, A/D converter 10 and latch circuit 11 for writing the sub-field video signal into the memory 12, as will be described in detail later, a read control circuit 14 in connection with the memory 12, latch circuit 15 and write control circuit 13 for reading out the stored signal from the memory 12, and a data transfer timing signal extracting circuit 180 in connection with the read control circuit 14 and write control circuit 13 for providing a data transfer timing signal to the control circuits. The switch circuit 9 is for the common use of the A/D converter 10 on a time slice basis for the processes of the luminance and color-difference signals. The latch circuits 15 have their outputs producing any of a "high" state, "low" state and high-impedance state (electrically insulated state).

Next, the operation of the foregoing arrangement will be described. The sub-field video signal selected by the video signal switching unit 210, e.g., the video signal provided by the television tuner 1, is fed to the video signal processing unit 220, in which it is separated into a luminance signal Y and color-difference signals R-Y and B-Y by means of the luminance signal extractor 6, color-difference signal extractor 7 and color-difference signal separator 8. Since the NTSC signal has such a distribution of color information across +500 kHz centered by the 3.58 MHz subcarrier ($f_{sc}$) and the luminance signal below 3 MHz approximately, the chrominance signal and luminance signal can be extracted using a band-pass filter 7 and low-pass filter 6, respectively. The chrominance signal is in quadrature modulation, and it can be demodulated into two color-difference signals (R-Y, B-Y) using a general color-difference signal separator 8. The colordifference signal and luminance signal are transformed into digital signals by the A/D converter 10, and these data are stored in the memory 12 by way of the latch circuit 11. By the provision of the switch circuit 9 for time slicing the luminance signal and two color-difference signals, only one A/D converter 10 is needed for this process. The digital signal is held temporarily in the latch circuit 11, and after the value has settled it is stored in the memory 12.

Figure 2:
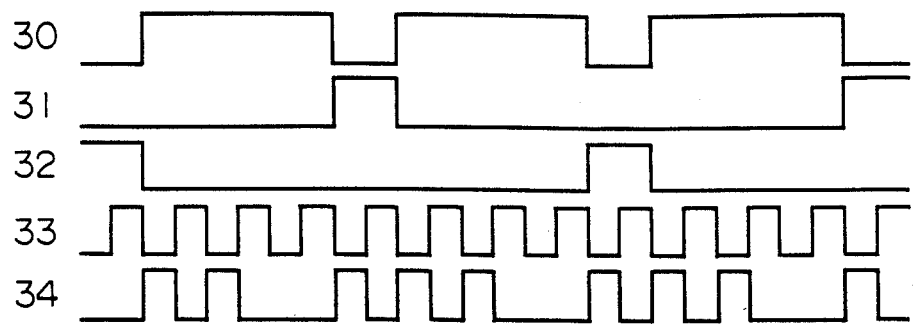
FIGS. 2, 6, 8 and 10 are waveform diagrams used to explain the inventive image processing system.
Figure 3:
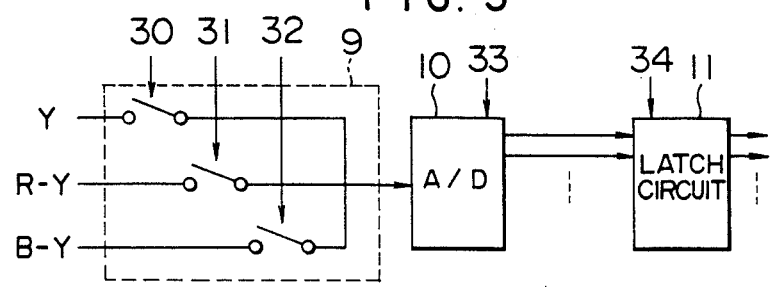
FIGS. 3 and 4 are block diagrams showing an example of the switch circuit and latch circuit.

The operation will be described in more detail with reference to FIGS. 2 through 6. FIG. 2 shows the waveform of the output signals from the write control circuit 13. Shown by 30, 31 and 32 are control signals for controlling the switch circuit 9, 33 is a control signal for controlling the A/D converter 10, and 34 is a control signal for controlling the latch circuit 11. FIG. 3 shows the arrangement including the switch circuit 9, A/D converter 10 and latch circuit 11 for latching (holding) only necessary signal portion in response to the latch control signal 34 before the signal is stored in the memory 12. When the control signals 30, 31 and 32 are high (in a high voltage level), switches in the switch circuit 9 become conductive, and the luminance signal (Y) and two color-difference signals (R-Y, B-Y) are conducted sequentially through the A/D converter 10 to the latch circuit 11. The A/D converter 10 operates to convert the input signal at the rising edge of the control signal 33. The luminance signal is sampled at a frequency four times the color-difference signals which are sampled alternately. Consequently, these signals are converted into time-series data Y, Y, R-Y, Y, Y, B-Y, and so on.

Figure 4:
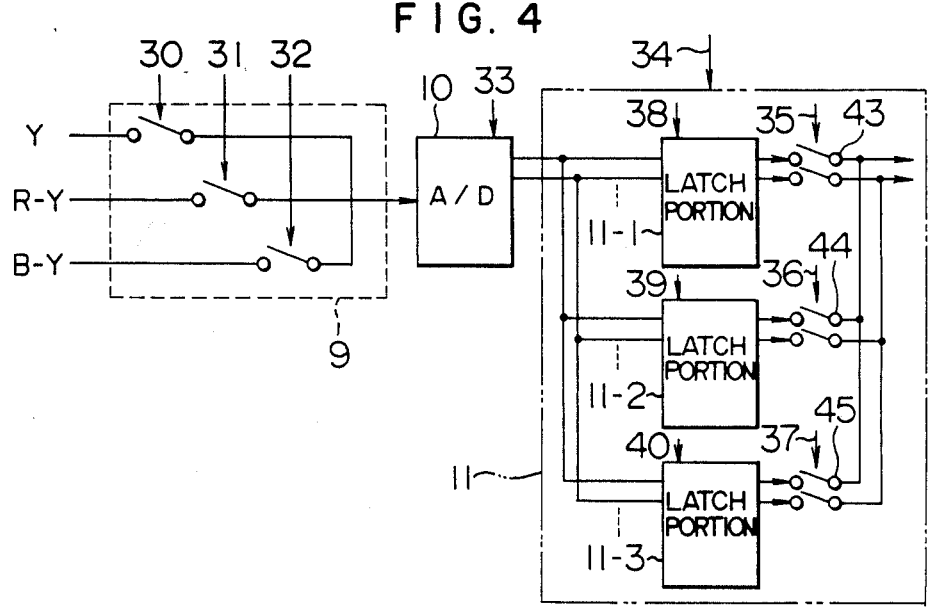

FIG. 4 shows another arrangement of the same circuit portion, in which data transfer control for the memory (will be described later) is taken into consideration. The arrangement includes shift registers or latches 11-1, 11-2 and 1-3 and switches 43, 44 and 45 which operate in unison. These latches and switches are controlled in a timing relationship shown in FIG. 6 as will be described later.

Figure 5:
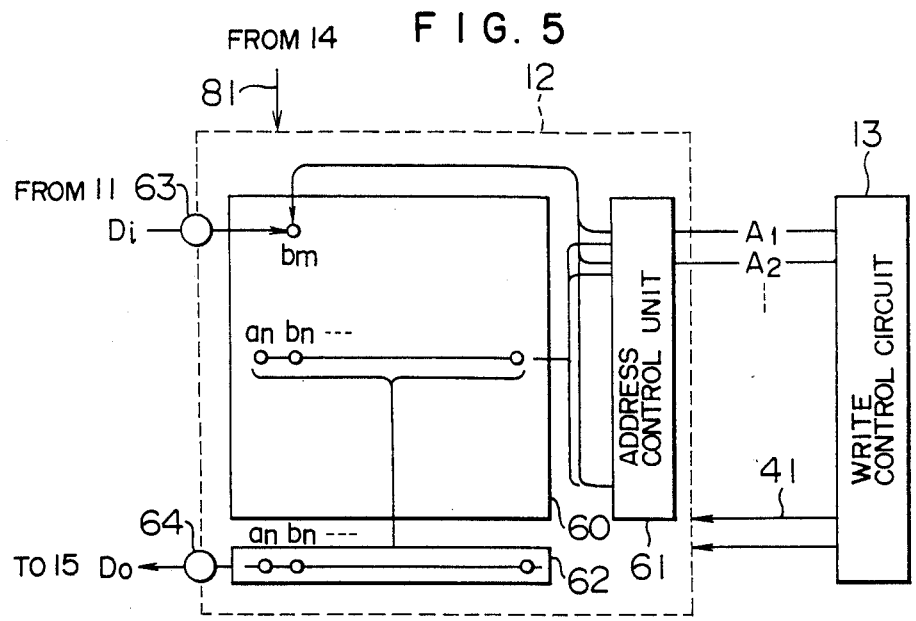
FIG. 5 is a block diagram showing an example of the memory.

Control of the memory 12 will first be described in connection with FIG. 5. The arrangement shown in FIG. 5 includes a first port (memory area) 60, an address controller 61 for designating the write address of data Di supplied on the input port 63, and a second port (output register) 62 of the dual-port memory 12. The memory used in this system is a dual-port memory which is prevalent in recent years, and it has its input port 63 and output port 4 controlled independently. The memory is written the input data Di in a random access manner, while it is read out in a serial manner. The memory operates relatively slower in writing relative to reading, and therefore it is suitable for time-axis compression, such as for "picture-in-picture" display operation. Writing into the memory area 60 in the memory 12 is carried out by specifying the address of one location within the memory area. The input data Di is written in a cell bm, for example, of the memory area 60 by way of the input port 63. For memory readout, a row of data an, bn and so on are transferred from the memory area 60 to the output register 62, and then the set of data are shifted out of the output register in the order of an, bn and so on. In the read operation, the address controller 61 specifies a row. The memory read/write operations are basically asynchronous. The write operation is suppressed only during the data transfer from the memory area 60 to the output register 62. This necessitates the holding of the input data in the forward latch circuit 11 during the data transfer, but it can be accomplished by the arrangement of FIG. 4.

Figure 6:
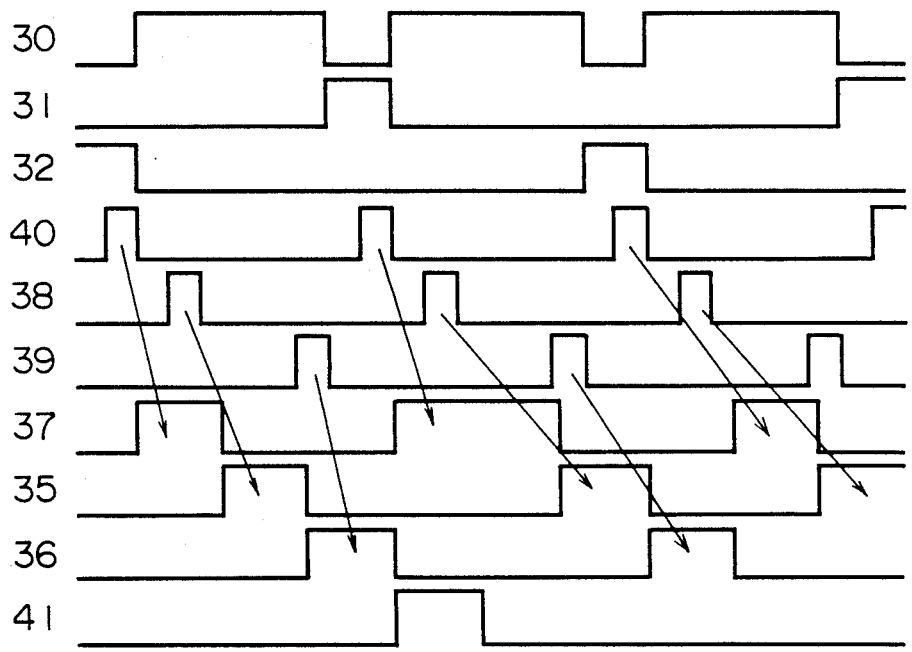

Next, the operation of the arrangement shown in FIG. 4 will be described with reference to FIG. 6 showing the output signal waveforms of the write control circuit 13. Shown by 30, 31 and 32 are control signals for controlling the switch circuit 9; 40, 38 and 39 are signals for controlling the latches 11-1,11-2 and 11-3 in the latch circuit 11 which hold the color-difference signals (R-Y, B-Y), the first luminance signal (Y) and the second luminance signal (Y) provided by the A/D converter 10, respectively, 35, 36 and 35 are control signals for controlling the switches 43-45 which introduce latched data into the memory 12, and 41 is a control signal issued during the data transfer for controlling the memory 12. The waveforms of FIG. 6 show the timing of data latch and timing of data output before and after the data transfer. The data latched in the latch 11-3 by the control signal 40 is outputted during the "high" period of the control signal 37. Similarly, the data latched in the latches 11-1 and 11-2 in the latch circuit 11 by the control signals 38 and 39 are outputted during the "high" period of the control signals 35 and 36. In this manner, a color-difference signal and two luminance signals are transferred to the memory 12 in the order of R-Y, Y, Y, B-Y, Y, Y, and so on. When data transfer is requested by a "high" control signal 41 in synchronism with the memory read operation, writing to the memory 12 does not take place. In this case, however, any one of the control signals 37, 35 and 36 coincident with data transfer (control signal 37 in the example of FIG. 6) has its output period extended. The output period can be extended up to the time point immediately before the next latching signal comes, and therefore latched data can be transferred in the correct order to the memory 12 without being destructed. Namely, at the data transfer, input data is latched in the latch circuit 11 and writing to the memory 12 is inhibited.

Figure 7:
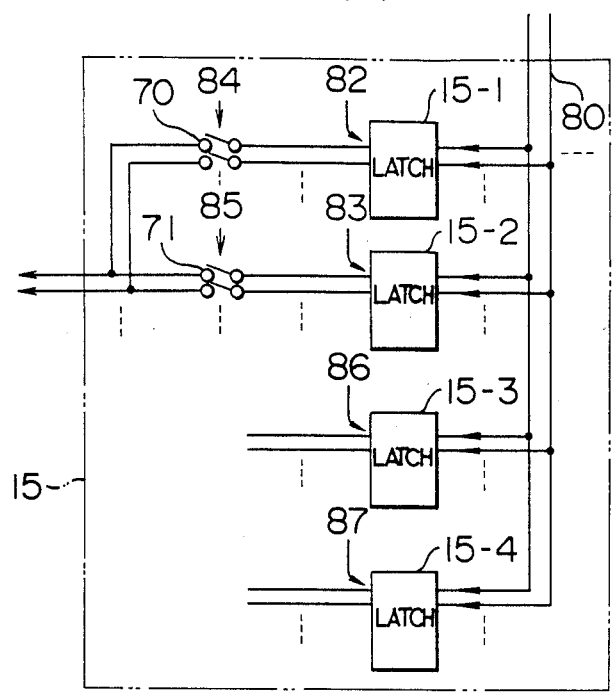
FIG. 7 is a block diagram showing an example of the latch circuit.
Figure 8:
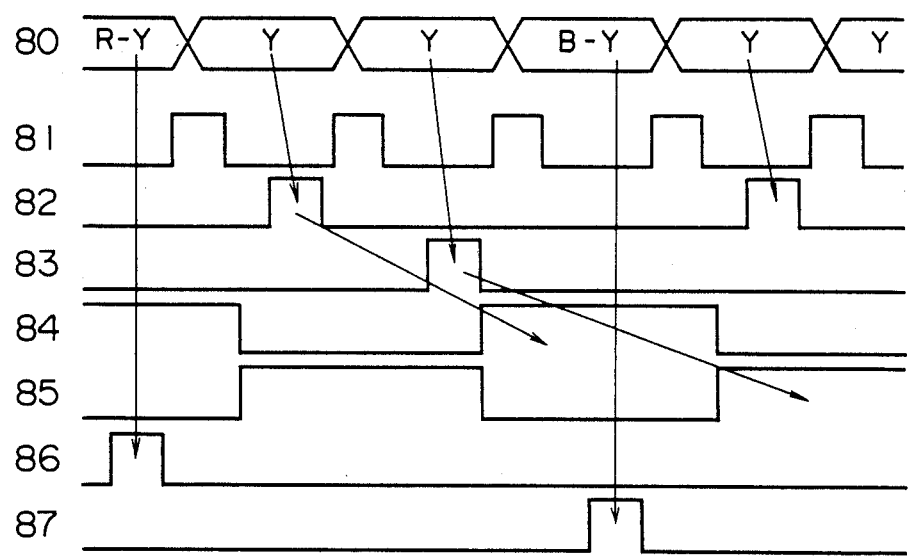

The read process of the memory 12 will be described with reference to FIGS. 7 and 8. FIG. 7 shows an example of the latch circuit 15, and FIG. 8 shows the waveforms of the output signal from the memory 12 and the output signal of the read control circuit 14. Shown by 80 is a string of data retrieved from the memory 12; 82, 83, 86 and 87 are control signals for controlling the latches 15-1 through 15-4 in the latch circuit 15, and 84 and 85 are control signals provided by the control circuit 14 for controlling the switches 70 and 71. In operation, the data string 80 read out of the output register 62 of the memory 12 in response to the clock signal 81 is held in latches 15-1 through 15-4 in response to the latch control signals 82, 83, 86 and 87. In order for the luminance signals to have a regular time interval, the switches 70 and 71 are operated by the control signals 84 and 85. The above control operation is implemented by the read control circuit 14 (FIG. 1), and as a whole time-axis compression by use of a dual-port memory is made possible.

Next, setting of the data transfer timing will be described. The timing of data transfer is at the end of output of a row (all or part) of data from the output register 62 of the memory 12, or at a time point when the need of transfer of the next row of data from the memory area 60 to the output register 62. As a timing of data transfer for time domain near the horizontal sync signal in the sub-field video signal is not suitable by the following reasons.

(1) Reading and writing have different clocks (for preventing the sampling error).

(2) The sampling clock needs to be reset near the horizontal sync for writing in order to prevent the sampling error for writing, and memory access is halted at this moment.

(3) The data shift operation for writing takes place near the horizontal sync.

On this account, it is conceivable that the read clock is used for memory access control only during the data transfer. However, the difference in the phase of the read and write clocks makes it very difficult the switching of control for the usual writing controlled by the write control and the data transfer controlled by the read clock. In conclusion, a control system having a data transfer timing out of phase with the horizontal sync for writing is desired.

Figure 9:
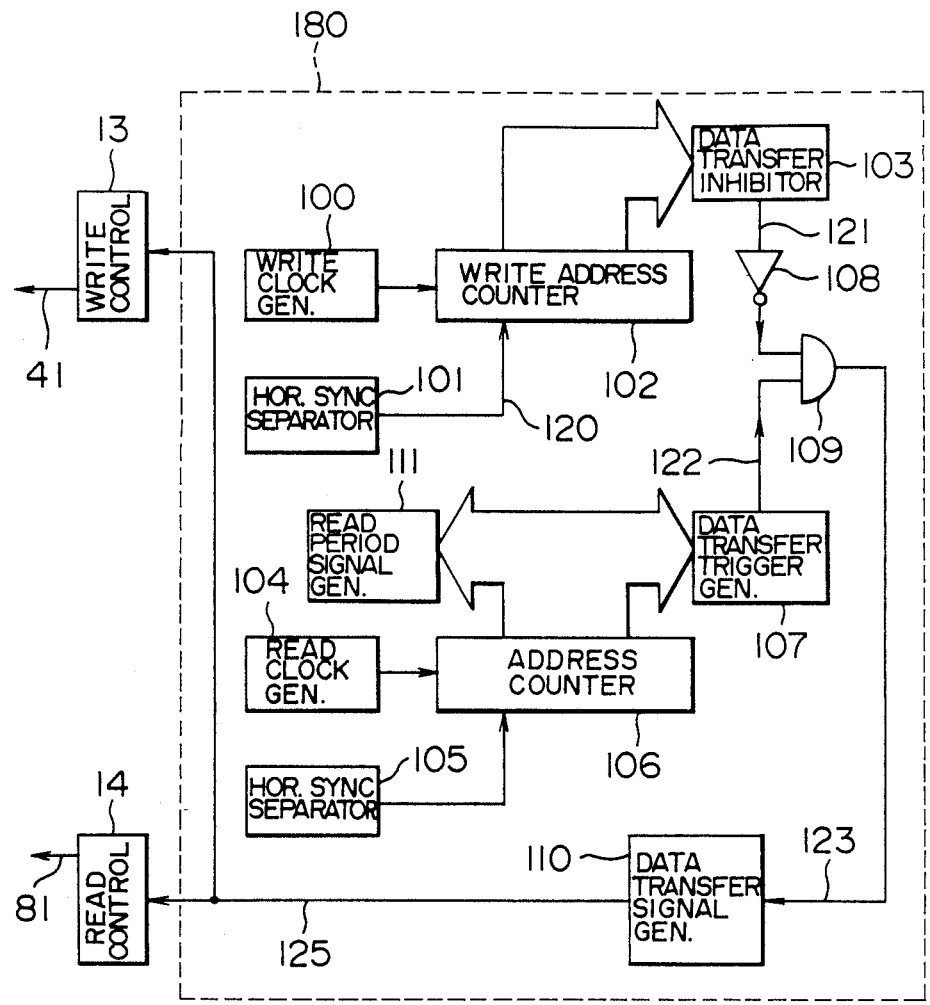
FIG. 9 is a block diagram showing an example of the data transfer timing extractor.
Figure 10:
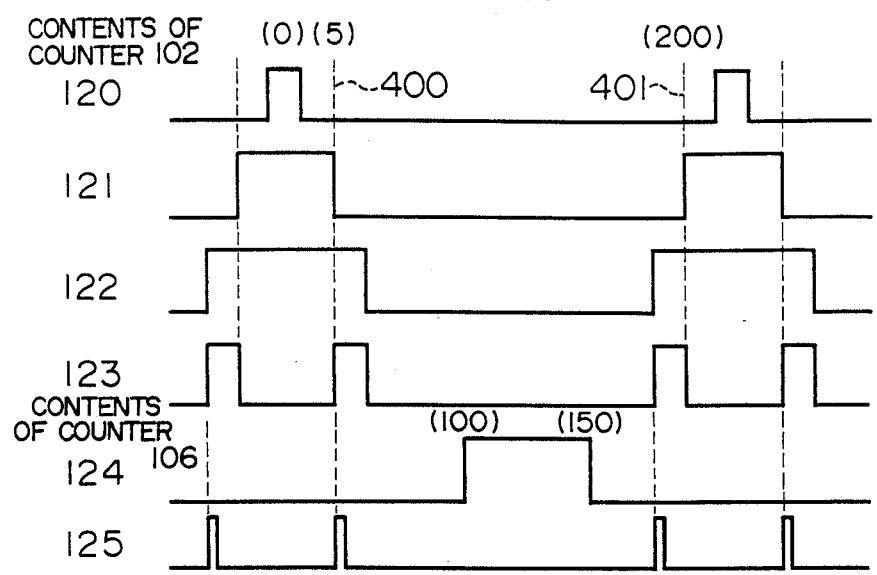

FIG. 9 shows in block diagram the arrangement of the data transfer timing signal extractor (shown by 180 in FIG. 1) which meets the above requirement, and FIG. 10 shows the waveforms of the principal signals observed in the circuit. The arrangement includes a write clock generator 100, a write horizontal sync separator 101, a write address counter 102, a data transfer inhibitor 103, a read clock generator 104, a read horizontal sync separator 105, a read address counter 106, a data transfer trigger generator 107, an inverter 108, an AND gate 109, a data transfer signal generator 110, and an image read period signal generator 111.

Next, the operation of the above arrangement will be described with reference to FIG. 10. Initially, the write address counter 102 is preset in response to the horizontal sync signal 120 extracted by the write horizontal sync separator 101. The counter 102 counts the clock produced by the write clock generator 100 to setup a data transfer period (pulse signal 121) before and after the horizontal sync signal. This pulse formation is achieved by the logical operations for the count of the address counter by the data transfer inhibitor 103. For example, when the counter 102 contains "5" and "200" at time points indicated by the dashed lines 400 and 401 in FIG. 10, the inhibitor 103 reveals the period where the count is larger than 200 and the period where the count is smaller than 5. If the read address counter 106 which counts synchronously with the read horizontal sync signal (not shown) provides a read period signal 124 for the sub-field video signal through the image read period signal generator 111, a data transfer trigger signal 122 is obtained in other time domain (outside of the read period) by the data transfer trigger generator 107, and the process for the signals 121 and 122 by the inverter 108 and AND gate 109 yields a signal 123, which operates on the data transfer signal generator 110 to produce a data transfer timing signal 125. The read period for the sub-field video signal is determined by the image readout period generator 111, e.g., when the counter 106 contains a value which is smaller than 100 and larger than 150 it is determined that the sub-field video signal is being read out. Although in this example of arrangement the functional blocks 100-102 and 104-106 are incorporated in the data transfer timing signal extractor 180, the blocks 100-102 may be incorporated in the write control circuit 13 and the blocks 104-106 and 111 may be incorporated in the read control circuit 14.

Figure 11:
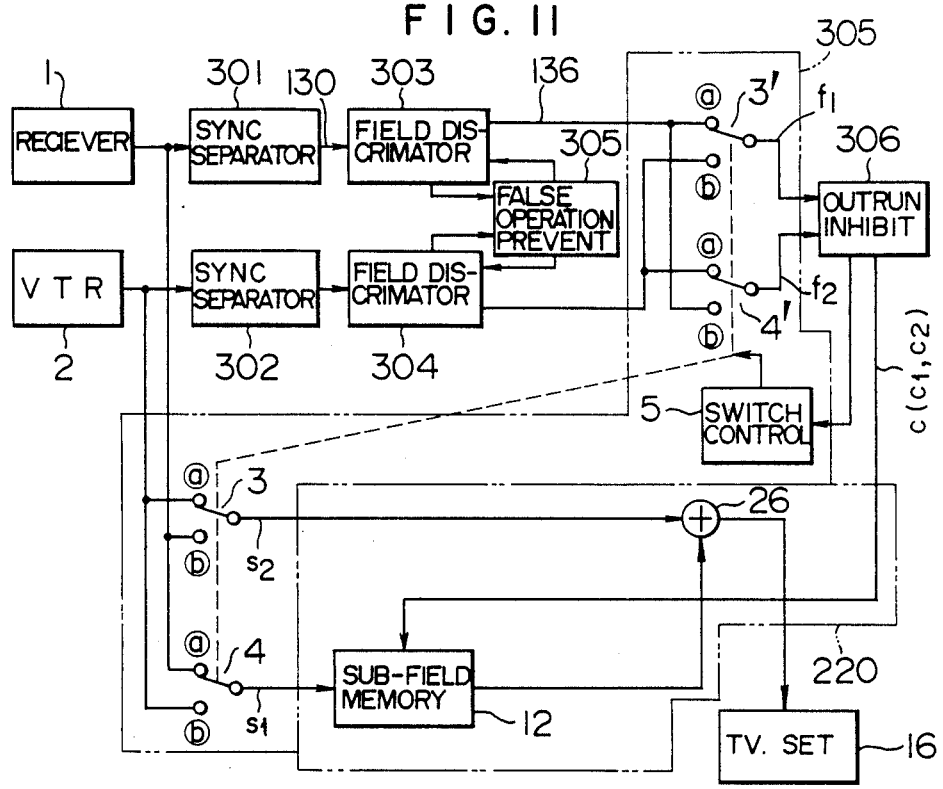
FIG. 11 is a block diagram showing another embodiment of the inventive image processing system.

FIG. 11 shows in block diagram the image processing system representing another embodiment of this invention. This embodiment is capable of accomplishing the "picture-in-picture" function for the sub-field with high picture quality using only one memory. According to this embodiment, the disturbance in sub-field which is caused by the outrun of the memory read phase over the memory write phase, i.e., the misalignment of sub-field video signals (2-field display) read out of the memory, can be prevented. The embodiment will be described in detail with reference to the drawing. In FIG. 11, the same portions and elements used in the preceding embodiment shown in FIG. 1 are referred to by the same symbols and therefore an explanation thereof will be omitted. Shown by 301 and 302 are sync separation circuits connected to the first and second video signal sources for separating the vertical and horizontal sync signals from the video signal, 303 and 304 are field discriminating circuits for discriminating the field of the main-field video signal by receiving the sync signals, 305 is a false operation preventing circuit, 3' and 4' are switches operated in unison and connected to the outputs of the field discriminating circuits 303 and 304; 306 is a field information read/write outrun inhibit circuit which receives the signals from the switches and produces a control signal for controlling the switching control circuit 5 and a control signal for controlling the dual-port memory 12 in the time-axis compressing circuit in the video signal processing unit 220, and a television receiver set 16.

In the above arrangement, the video signals including the main-field video signal and sub-field video signal originating from the video signal sources 1 and 2 are fed to the sync separating circuits 301 and 302, respectively, by which the vertical sync signal and horizontal sync signal are separated. The video signals are further fed through the field discriminating circuits 303 and 304 and switches 3' and 4', and supplied to the outrun inhibit circuit 306. At the same time, the mainfield video signal from the video signal source 2 is fed through the switch 3 to one input terminal of signal merging circuit 26. The sub-field video signal from the video signal source 1 is fed through the switch 4 to the memory 12, and after it is compressed on the time-axis by the memory it is delivered to another input terminal of the circuit 26. The main and sub-field video signals merged by the circuit 26 are delivered to the television receiver set 16, on which two fields are displayed to accomplish the "picture-in-picture" function. In this operation, the false operation preventing circuit 305 and switching control circuit 5 play a protective role for coping with the field discriminations for sync signals disturbed by noises and transitional operation at the interface of the two fields. The false operation preventing circuit 305 and the switching control circuit 5 may be simplified or eliminated in some cases.

Figure 12:
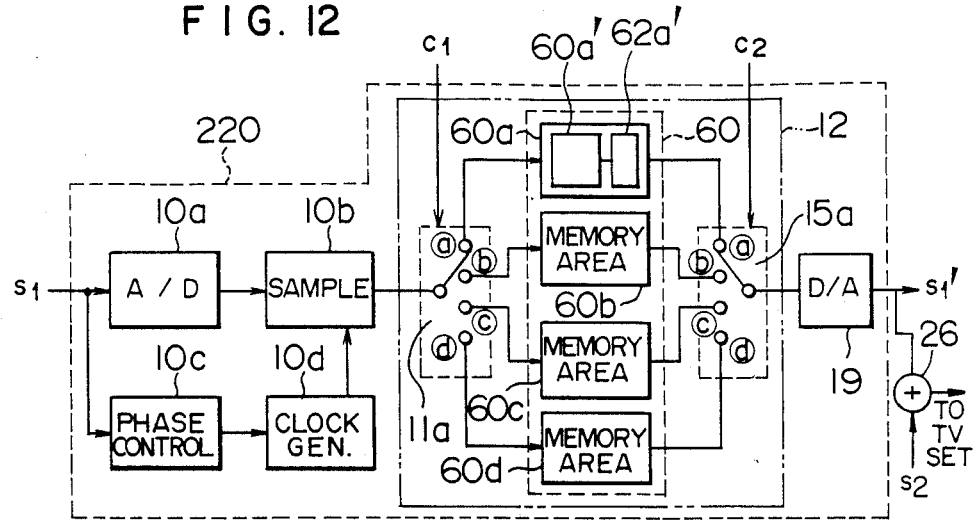
FIGS. 12 and 13 are block diagrams showing part of the video signal processing unit.
Figure 13:
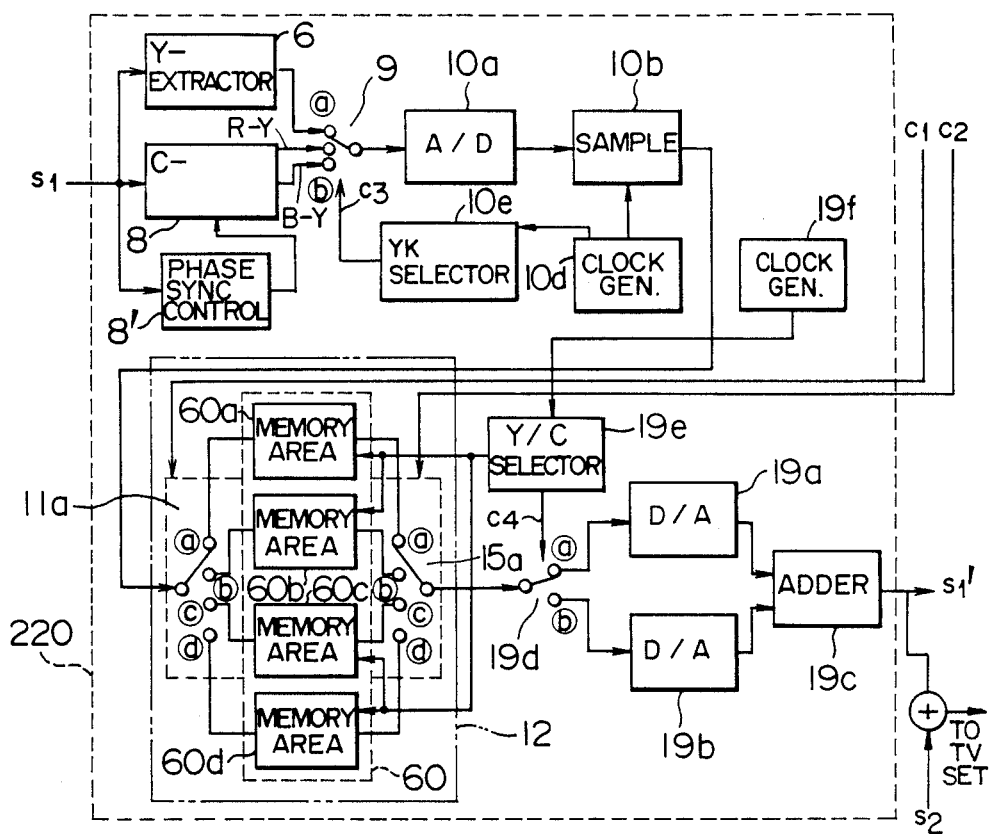

Next, the arrangement and operation of the individual functional blocks will be described in more detail using waveform diagrams. FIGS. 12 and 13 are block diagrams for explaining the read/write operations of the memory 12. Shown in FIG. 12 by 10a is an analog-to-digital (A/D) converter, 10b is a sampling circuit, 10c is an automatic phase controller, 10d is a clock signal generator, 11a and 15a are switches, 60a–60d are areas of a memory 12, and 19 is a digital-to-analog (D/A) converter. In operation, the sub-field video signal S1 in a digital form at the end of the A/D converter 10a is sampled by the sampling circuit 10b in response to the clock signal provided by the clock signal generator 10d. The clock signal is controlled by the automatic phase controller 10c to be in-phase with the burst signal of the sub-field video signal S1, and it has a frequency twice or more of the burst signal. The sampled signal is written into any of the areas 60a–60d in the memory 12. The memory readout operation takes place in asynchronous manner with the write operation. The memory read and write operations are carried out by switching the switches 11a and 15a by the control signal C (C1 and C2) from the outrun inhibit circuit 306 based on the result of field discrimination by the field discriminating circuits 301 and 302 (FIG. 11), Transforming the signal read out of the memory areas 60a–60d into an analog signal by the D/A converter 19 results in a signal S1' which is a time-axis compressed version of the sub-field video signal S1.

Shown in FIG. 13 by 6 is a luminance signal extractor, 8 is a color-difference separator, 8' is an automatic phase synchronization control circuit, 9 and 19d are switches, 10e is a color-difference and luminance switching circuit, 19a and 19b are D/A converters, and 19c is an adder, 10e and 19e are Y/C selectors, 10d and 19f are (write and read) clock generators. The difference between FIG. 12 and FIG. 13 is whether or not the sub-field video signal S1 is decomposed into the luminance signal and color-difference signal. The former can be called "composite system", and the latter "component system". The following describes the operation of the component system. The NTSC signal forming the video signal S1 in FIG. 13 is known to be the quadrature modulation of the color-difference signal in which two kinds of color information are modulated in the phase difference relative to the burst signal, and therefore demodulation of this signal necessitates the clock signal which is in-phase with the burst signal. As an example of the arrangement for the clock generation, the automatic phase synchronization control circuit 42 is used for the control. The circuit is known in the art and its detailed explanation will be omitted. The color signal separator 8 is merely required to demodulate the color-difference signal from the NTSC signal, and a commonly used demodulator suffices for this purpose. The luminance signal is extracted by the luminance signal extractor 6, and also in this case a usual low-pass filter suffices for the purpose.

The input signal which has been decomposed into the luminance signal and color-difference signal is fed through the switch 9 to the A/D converter 10a, by which it is transformed into digital data in a time slicing manner. After that the data is stored in the memory areas 60a–60d by way of the sampling circuit 10b and switch 11a. This management of the signal is due to the use of a single A/D converter, and in exchange for the provision of a plurality of A/D converters the switch circuits 9 and 19d and the color-difference and luminance switching circuit 10e can be eliminated.

In synchronism with the clock signal produced by the clock signal generator 10d, the switch 19 is operated by the signal C3 and at the same time sampling is implemented by the sampling circuit 10b. Accordingly, the switch 19 is positioned to ⓐ-terminal, the luminance signal is A/D converted and sampled by the samping circuit 10b and then written in the memory areas 60a–60d. With the switch 19 positioned to ⓑ-terminal, the color-difference signal is sampled and written in the memory areas 60a–60d. For reading, the switch 19d is operated in synchronism with the reading clock generated by the generator 19f, which controls the memory areas 60a–60d through the Y/C selector 19e. Namely, the read clock is controlled by the color-difference and luminance switching circuit 10e so that the luminance and color-difference signals are read out in a prescribed order, and the switch 19d is operated at this timing. In consequence, the switch 19d is positioned to ⓐ-terminal at reading of the luminance signal out of the memory areas, while the switch is positioned to ⓑ-terminal at reading of the color-difference signal, and after being transformed into analog signals by the D/A converters 19a and 19b both signals are added to time-compressed sub-picture signal and merged by the merging circuit 26 in the main-picture signal (S2). This summing operation implies modulation to the NTSC signal, and a usual NTSC modulator suffices for the purpose.

Figure 14:
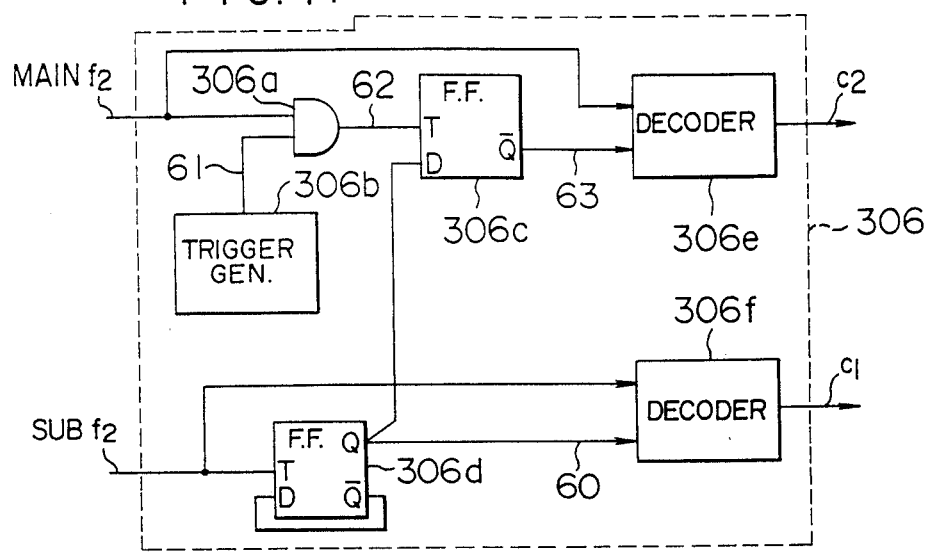
FIG. 14 is a block diagram showing an example of the outrun inhibit circuit.
Figure 15:
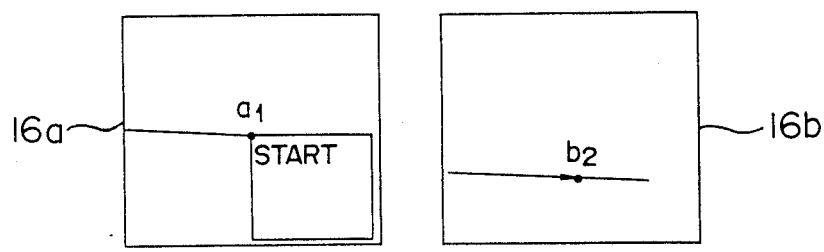
FIGS. 15, 16 and 17 are diagrams of displays on the screen and waveform diagrams of signals, all pertinent to the explanation with FIG. 14.
Figure 16:
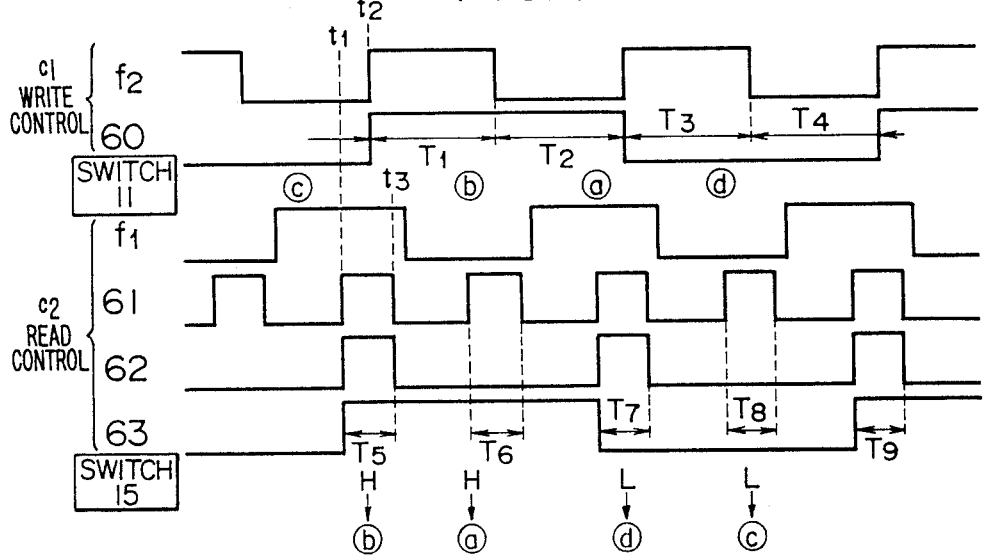
Figure 17:
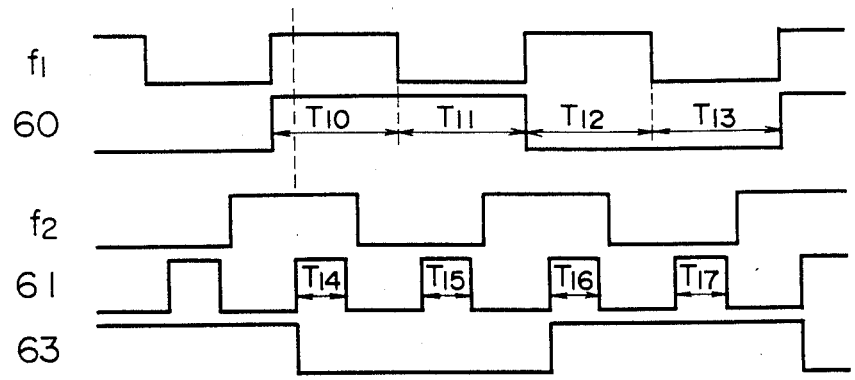

Next, a specific arrangement and operation of the outrun inhibit circuit 306 will be described. FIG. 14 shows in block diagram the arrangement of the outrun inhibit circuit 306, FIG. 15 explains screens which aid in the explanation of the circuit, and FIG. 17 is a waveform diagram used to explain the operation of the circuit. In FIG. 14, shown by 306a is an AND gate, 306b is a sub-field trigger generator, 306c and 306d are flip-flops, and 306e and 306f are decoders. These decoders are drawn in order to explain the switches (11a and 15a), in fact, are included in the dual port memory (FIG. 5 element 12). In FIG. 15, shown by 16a and 16b are screens on the Braun tube of the television receiver set. In FIGS. 16 and 17, shown by T1 through T17 are time bands on the signal waveforms. The main-field and sub-field discrimination signals f2 and f1 are the input signals to the outrun inhibit circuit 306.

The operation of the outrun inhibit circuit 306 will be described. The field discrimination signal f1 for the sub-field is divided in frequency by two by the flip-flop 306d, which produces a signal 60 on its Q-output. The field discrimination signal (information) f2 for the main-field is input to AND gate 306a along with the main-field trigger signal 61 produced by the main-field trigger generator 306b. The main-field trigger signal 61 is a pulse which rises when the scanning spot has reached a point a1 on the screen 16a (see FIG. 15), and it indicates the starting time point for the sub-field display (the falling time point is arbitrary). Screen 16b represents an original picture to be compressed into the sub-field region of FIG. 16a. Point b2 is information at a point within the original sub-field picture. The resulting signal 62 is used as a data input trigger for the flip-flop 306c. The flip-flop 306c has its input terminal D receiving a signal 60 which is the result of frequency division for the signal f1 by the flip-flop 306d, and therefore the flip-flop 306c produces a signal 63 on its $\bar{Q}$-output. The following Table 1 lists the states of the signal f1 and signal 60 in the time bands T1 and T4 and the signal f2 and signal 63 in the time bands T5-T9.

TABLE 1

| (pertinent to FIG. 16) | | | | | |
|---|---|---|---|---|---|
| Time band | T1 | T2 | T3 | T4 | |
| Signal f1 | H | L | H | L | |
| Signal 60 | H | H | L | L | |
| Time band | $T_5$ | $T_6$ | $T_7$ | $T_8$ | $T_9$ |
| Signal f2 | H | L | H | L | H |
| Singal 63 | H | H | L | L | H |

(H: high, L: low)

If the phase relationship between the main and sub-field video signals is varied, the resulting in waveform diagram shown in FIG. 17. The states of the signal f2 and signal 60 in the time bands T10-T13 and the signal f1 and signal 63 in the time bands T14-T17 are as shown in Table 2.

TABLE 2

| (pertinent to FIG. 17) | | | | |
|---|---|---|---|---|
| Time band | T10 | T11 | T12 | T13 |
| Signal f2 | H | L | H | L |
| Signal 60 | H | H | L | L |
| Time band | $T_{14}$ | $T_{15}$ | $T_{16}$ | $T_{17}$ |
| Signal f2 | H | L | H | L |
| Signal 63 | L | L | H | H |

(H: high, L: low)

The decoders 306e and 306f operates switches 11a and 15a respectively as shown in FIG. 12 or FIG. 13 using control signals C1 and C2. The decoders 306e and 306f in response to signals f1 and 60 or signals f2 and 63 produce the switch positions as shown in the following Table 3.

TABLE 3

| Signal f2 | L | H | L | H |
|---|---|---|---|---|
| Signal 60 | H | H | L | L |
| | ↓ | ↓ | ↓ | ↓ |
| Selected switch | ⓐ | ⓑ | ⓒ | ⓓ |

TABLE 3-continued

| position (Write SW.11a) | | | | |
|---|---|---|---|---|
| Signal f1 | L | H | L | H |
| Signal 63 | H | H | L | L |
| | ↓ | ↓ | ↓ | ↓ |
| Selected switch position (Read SW. 15a) | ⓐ | ⓑ | ⓒ | ⓓ |

(H: high, L: low)

Writing to any of memory areas 60a-60d and reading from any of memory areas 60a-60d in the memory area 60 are controlled in accordance to the outputs f1 and f2 of the field discrimination circuits 303 and 304. In the preceding eXample, with the phase relationship between the main and sub-field video signals shown in FIG. 17, the time difference between reading and writing of a memory area is greater than 1-field scanning length. In the phase relationship shown in FIG. 16, the time difference between reading and writing is short, but in this case reading always precedes writing for a memory area. For example, as indicated in Table 3, at time t1 in FIG. 16, the signal f1 and signal 60 are both low, causing the read switch 15a to position to ⓒ-terminal, while the signal f2 and signal 63 are both high, causing the write read switch 15a to turn to ⓑ-terminal. At the time point when the scanning has reached the sub-field a1 as shown in the screen 16a of FIG. 15, the b2 information for the screen 16b is written in the memory, but in this case reading takes place for the memory area 60c and writing takes place for the memory area 60b. At time t2 in FIG. 16, the signals f1 and 60 and signal f1 and 63 go high, causing the switch 15a and 11a respectively to turn to b-terminal. Reading and writing take place for the same memory area 60b, but in the time band T5 reading for the memory area 60b always precedes, and therefore the writing phase never outruns the reading phase. Reading of the memory area 60b completes at time t3, and a short while later following the end of the time band T1, writing of the memory area 60b completes. For the same memory area, the reading phase and writing phase becomes closest when the signals f1, f2, 60 and 63 rise coincidently, but even under this condition reading always precedes writing except for a coincident moment at the beginning of reading and writing for a memory area. For example ⅓ size Pin P, reading speed is 3 times as fast as writing speed. Accordingly, the outrun phenomenon can be prevented by the present invention.

Figure 18:
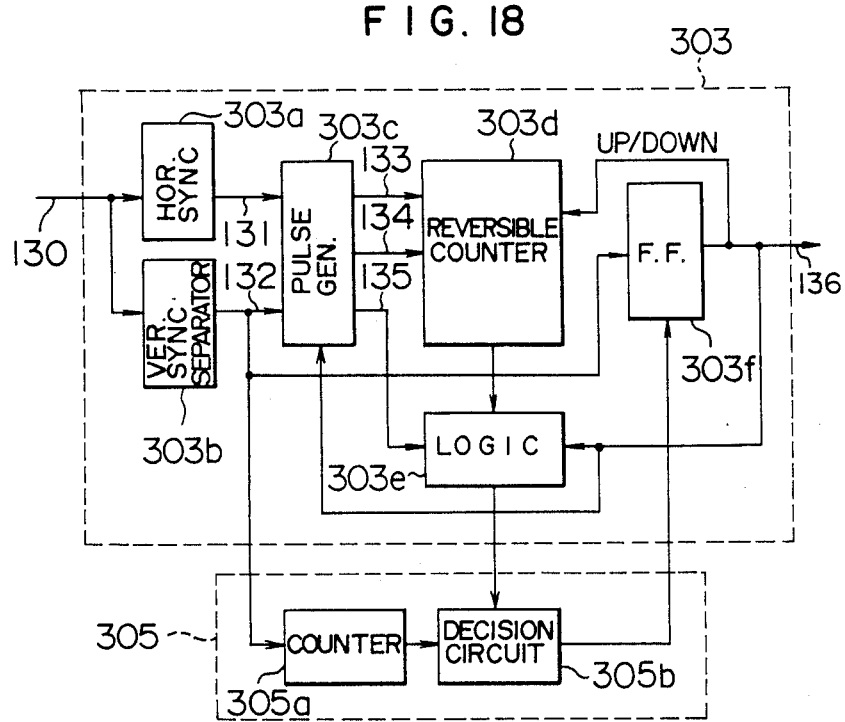
FIG. 18 is a block diagram showing an example of the field discrimination circuit and false operation preventing circuit.

Next, a specific arrangement and operation of the field discrimination circuit 303 and false operation preventing circuit 305 shown in FIG. 18 will be described. In the figure, shown by 303a is a horizontal sync separator, 303b is a vertical sync separator, 303c is a pulse generating circuit, 303d is a reversible counter, 303e is a logic circuit, 303f is a flip-flop, 305a is a frequency division counter, and 305b is a decision circuit. Shown by 134 is a preset pulse applied to the reversible counter 303d, and 135 is a latching pulse for the output of the reversible counter 303d.

The operation of the above arrangement will be described with reference to the principal signal waveforms shown in FIGS. 19 and 20. The sync-separated signal 130 is fed to the horizontal sync separator 303a and vertical sync separator 303b, by which a horizontal sync signal 131 and vertical sync signal 132 are extracted. The number of pulses of the horizontal sync signal 131 in the outside of the period of the vertical sync signal 132 varies in each field, and the number of pulses of the horizontal sync signal within the vertical sync signal period (a, b, c) also varies in each field. It is a matter of choice to count the number of pulses of the horizontal sync signal 131 inside or outside of the vertical sync period, but in this embodiment to save the bits count, the number of pulses of the horizontal sync signal 131 within the vertical sync period (a, b, c) are counted. For this purpose, the pulse generating circuit 303c extracts horizontal sync pulses 133 within the vertical sync periods a, b and c, and supplies them as a clock to the reversible counter 303d. The reversible counter 303d reveals the difference of horizontal sync pulses 133 among the consecutive vertical sync periods a, b and c. Namely, the circuit bases the field discrimination on the difference of horizontal sync pulses 133 in consecutive vertical sync periods.

The field discrimination operation will be described in more detail in the following. The flip-flop 303f doubles the period of the vertical sync signal 132, and the first horizontal sync pulse (e) during the high period of that vertical sync signal and following the falling of the original vertical sync signal is used to make a latching pulse 134, and the subsequent horizontal sync pulse (d) is used to make a presetting pulse 135. In this embodiment, the reversible counter 303d is made up of three bits having bit outputs Q1, Q2 and Q3, and the counter is preset to have '111' on the Q1, Q2 and Q3, i.e., a preset value of '7'. The reversible counter 303d is designed to up-count in response to a high output signal 136 from the flip-flop 303f and down-count in response to a low output signal 136. Under these operating conditions, the reversible counter 303d which has been preset to value '7' in response to the preset pulse 135 at time point d operates to down-count (because of the low signal 136) the horizontal sync pulses 133 within the period of the next vertical sync signal 132. Accordingly, the counter 303d down-counts from '7' to '6' to '5' and to '4' as shown by 137 in FIG. 19, and in the next vertical sync period c up-counts the pulses 133 from '5' to '6' to '7' and to '0'. The count value 0 is latched in response to the latch pulse 134 at e.

When the signal 136 goes high in periods (a and c) including a larger number of horizontal sync pulses among the vertical sync periods a, b and c, as in the above case, the latched count value is rendered zero. In another case shown in FIG. 20, where the vertical sync periods a, b and c include horizontal sync pulses 133 in '3', '4' and '3' in number, respectively, the latched count value when the signal 136 goes low in the period (b) including larger number of horizontal sync pulses is '7'. The above latching operation and discrimination of the count value are the role of the logic circuit 303e, and it suffices to determine whether the latched value of Q3 is high or low. (when the latched data is '0', Q3 is low, when '7', Q3 is high)

Figure 19:
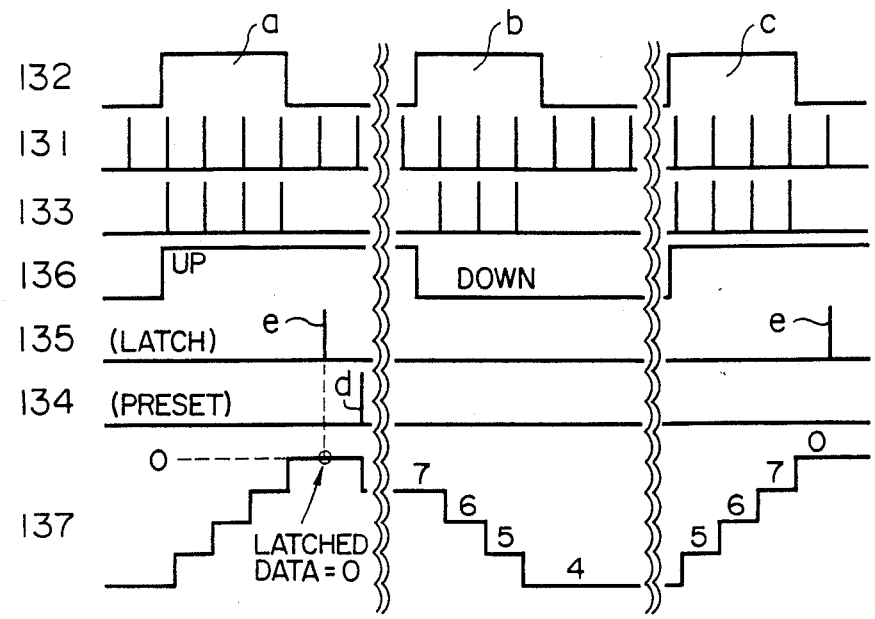
FIGS. 19 and 20 are waveform diagrams used for the explanation with FIG. 18.
Figure 20:
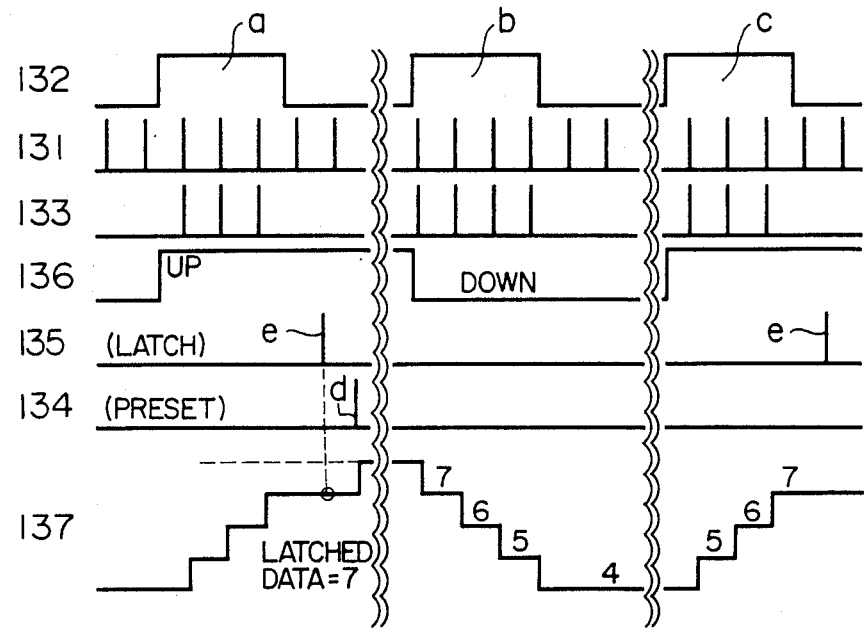

If the signal 136 in FIGS. 19 and 20 is used as the field discrimination signal f1, one of the cases of FIGS. 19 and 20 is a false judgment, and therefore the phase of the flip-flop 303f is unchanged or unchanged or inverted depending on this judgment result. In this case, single judgment result can be erroneous due to a noise component on the sync signals, and therefore it is desirable to make a final decision using several judgment results. The false operation preventing circuit 305 is provided for this purpose, and it includes a decision circuit 305b which makes a final decision upon consistent results of count for the vertical sync signal 132 (or signal 136) by the counter 305a. The flip-flop 303f is controlled to reverse upon successive false decisions in several count operations, and the noise immunity of the operation can be enhanced significantly.

As for the switching control circuit 5 in FIGS. 11 and 12, it serves to exchange the main-field and sub-field in the picture in picture (P in P) display. The circuit is operated in synchronism with the vertical sync signal to gain the smoothness. Since the circuit can be arranged using known means, its detailed explanation will be omitted.

According to the foregoing embodiments of this invention, 2-field patches the top part and the bottom after part of the screen, which has occurred in the conventional P in P system in displaying a sub-field due to outrun of read/write phases, can be eliminated, and a sub-field display can be a complete 1-field picture even in the case of fast motion, whereby the performance can effectively be improved.

We claim:

1. An image processing system comprising:
   a memory which is capable of storing four fields of sub-field video signals;
   field discriminating means which discriminate odd-numbered and even-numbered fields of the sub-field video signals;
   divider means for diving the discriminated sub-field video signals;
   field discrimination means which discriminate odd-numbered and even-numbered fields of main-field video signals;
   displaying period control means which outputs a displaying period signal of the sub-field video signals;
   merging means which merges main-field video signals or sub-field video signals to output in accordance with the controlled displaying period signal;
   write address control means for deciding an address area in the memory to write information in accordance with the discriminated sub-field video signals and the divided sub-field video signals and;
   read address control means for deciding the read address area in the memory according to said discriminated main-field video signals, the displaying period signal and said divided sub-field video signals.

2. An image processing system according to claim 1, wherein each of said field discriminating means for main-field and sub-field video signals comprises:
   a reversible counter which counts the number of horizontal sync signals inside or outside a vertical sync signal period of the image and sub-field video signals, means for presetting said reversible counter once in N periods (where N is a positive integer) of the vertical sync signal, sample-holding means which samples and holds the contents of said reversible counter immediately before presetting, second frequency-division means which implements frequency division for the vertical sync signal, and frequency-division phase control means which varies the frequency-division phase of said second frequency-division means in accordance with the output of said sample holding means.

3. An image processing system according to claim 2, further comprising:
   a counter for counting the vertical sync signal or the output of said second frequency-division means, variation detection means which detect whether or not the output of said sample-holding means varies during a certain count period of said counter, and means for operating on said frequency-division phase only at the detection of variation by said variation detecting means.

* * * * *